(12) United States Patent
Sautter et al.

(10) Patent No.: US 9,694,757 B2
(45) Date of Patent: Jul. 4, 2017

(54) BOARD CARRIER

(71) Applicant: Yakima Innovation Development Corporation, Georgetown Grand Cayman (KY)

(72) Inventors: Chris Sautter, Portland, OR (US); Jason A. Sagen, Portland, OR (US); Dave Condon, Wilsonville, OR (US)

(73) Assignee: Yakima Innovation Development Corporation, Georgetown, Grand Cayman (KY)

( * ) Notice: Subject to any disclaimer, the term of this patent is extended or adjusted under 35 U.S.C. 154(b) by 132 days.

(21) Appl. No.: 14/592,869

(22) Filed: Jan. 8, 2015

(65) Prior Publication Data

US 2015/0191127 A1     Jul. 9, 2015

Related U.S. Application Data

(60) Provisional application No. 61/925,094, filed on Jan. 8, 2014.

(51) Int. Cl.
*B60R 9/052* (2006.01)
*B60R 9/08* (2006.01)

(52) U.S. Cl.
CPC ............... *B60R 9/052* (2013.01); *B60R 9/08* (2013.01)

(58) Field of Classification Search
CPC  B60R 9/042; B60R 9/08; B60R 9/048; B60R 9/12; B60R 9/052; B60R 9/04; B60P 3/1025
USPC ........................................ 224/310, 331, 568
See application file for complete search history.

(56) References Cited

U.S. PATENT DOCUMENTS

| 486,981 A | 11/1892 | Gruenhagen |
| 913,469 A | 2/1909 | Cleaveland |
| 1,500,924 A | 7/1924 | Chadwick et al. |
| 1,807,104 A | 5/1931 | Schat |
| 2,513,169 A | 6/1950 | Griswold |
| 2,613,020 A * | 10/1952 | Berry .................... B60P 3/1025 224/310 |
| 2,674,141 A | 4/1954 | Cowan |
| 2,840,288 A | 6/1958 | Broddon |
| 2,916,786 A | 12/1959 | Legat |
| 3,001,679 A | 9/1961 | Canning et al. |
| 3,524,572 A | 8/1970 | Hall |
| 3,703,024 A | 11/1972 | Johnson |

(Continued)

FOREIGN PATENT DOCUMENTS

| AU | 2011101507 A4 | 4/2012 |
| DE | 3513875      * | 4/1985 |

(Continued)

OTHER PUBLICATIONS

U.S. Patent and Trademark Office, Office action regarding U.S. Appl. No. 12/493,106, Dec. 8, 2011, 15 pages.

(Continued)

*Primary Examiner* — Adam Waggenspack
(74) *Attorney, Agent, or Firm* — Kolisch Hartwell, P.C.

(57) ABSTRACT

A vehicle rooftop system for carrying boards, such as SUP boards, may include a support unit having an elongate body, a self-adjusting strap slidably attached to the body, and a load-assist roller. A lockable cam buckle for securing the strap may be included at one end portion of the unit, and a paddle carrier may be included at another end portion.

11 Claims, 7 Drawing Sheets

(56) References Cited

U.S. PATENT DOCUMENTS

| | | | |
|---|---|---|---|
| 3,708,081 A * | 1/1973 | Schladenhauffen | B60P 3/1025 |
| | | | 414/462 |
| 3,828,993 A | 8/1974 | Carter | |
| 3,848,784 A | 11/1974 | Shimano et al. | |
| 3,861,533 A | 1/1975 | Radek | |
| 3,875,771 A | 4/1975 | Reisner | |
| 3,879,810 A | 4/1975 | Prete, Jr. et al. | |
| 3,987,653 A | 10/1976 | Lyon et al. | |
| 4,081,118 A | 3/1978 | Mason | |
| 4,126,228 A | 11/1978 | Bala et al. | |
| 4,333,575 A | 6/1982 | Wong | |
| 4,366,605 A | 1/1983 | McKenney | |
| 4,372,469 A * | 2/1983 | Kowalski | B60R 9/045 |
| | | | 224/321 |
| 4,547,980 A | 10/1985 | Olivieri | |
| 4,616,771 A | 10/1986 | Heideman | |
| 4,620,813 A | 11/1986 | Lacher | |
| 4,685,315 A | 8/1987 | Comolli | |
| 4,819,294 A | 4/1989 | Calvert | |
| 4,842,148 A | 6/1989 | Bowman | |
| 5,094,373 A | 3/1992 | Lovci | |
| 5,201,911 A | 4/1993 | Lee | |
| 5,265,897 A | 11/1993 | Stephens | |
| 5,358,162 A * | 10/1994 | Hill | B60R 9/045 |
| | | | 224/316 |
| 5,416,952 A | 5/1995 | Dodge | |
| 5,423,644 A | 6/1995 | First, Sr. | |
| 5,479,836 A | 1/1996 | Chang | |
| 5,516,017 A | 5/1996 | Arvidsson | |
| 5,598,959 A | 2/1997 | Lorensen et al. | |
| D386,145 S | 11/1997 | Staller | |
| 5,685,686 A | 11/1997 | Burns | |
| 5,709,521 A | 1/1998 | Glass et al. | |
| 5,738,258 A | 4/1998 | Farrow et al. | |
| 5,745,959 A | 5/1998 | Dodge | |
| 5,749,694 A | 5/1998 | Ackerman et al. | |
| 5,752,638 A | 5/1998 | Meeks | |
| 5,769,291 A | 6/1998 | Chasan | |
| 5,775,557 A | 7/1998 | Arvidsson | |
| 5,820,002 A | 10/1998 | Allen | |
| 5,875,947 A | 3/1999 | Noel et al. | |
| 5,951,231 A | 9/1999 | Allen | |
| 5,996,870 A | 12/1999 | Shaver | |
| D422,553 S | 4/2000 | VonDuyke | |
| 6,131,781 A | 10/2000 | Murray | |
| 6,164,507 A | 12/2000 | Dean et al. | |
| 6,199,412 B1 | 3/2001 | Kennedy | |
| 6,283,310 B1 | 9/2001 | Dean et al. | |
| 6,286,738 B1 | 9/2001 | Robins et al. | |
| 6,315,181 B1 | 11/2001 | Bradley et al. | |
| 6,321,678 B1 | 11/2001 | Skulnick | |
| 6,367,673 B1 | 4/2002 | Smith et al. | |
| 6,385,822 B1 | 5/2002 | Dean et al. | |
| 6,390,309 B1 | 5/2002 | Tucker | |
| 6,422,441 B1 | 7/2002 | Settelmayer et al. | |
| 6,425,509 B1 | 7/2002 | Dean et al. | |
| 6,428,263 B1 * | 8/2002 | Schellens | B60R 9/042 |
| | | | 224/310 |
| 6,431,423 B1 | 8/2002 | Allen et al. | |
| 6,439,397 B1 | 8/2002 | Reeves | |
| 6,460,708 B2 | 10/2002 | Dean et al. | |
| 6,460,743 B2 | 10/2002 | Edgerly et al. | |
| 6,470,718 B1 | 10/2002 | Yang | |
| 6,494,351 B1 | 12/2002 | Dean | |
| 6,510,717 B1 | 1/2003 | Levi | |
| 6,543,096 B2 | 4/2003 | Settelmayer et al. | |
| 6,561,396 B2 | 5/2003 | Ketterhagen | |
| 6,561,398 B1 | 5/2003 | Cole et al. | |
| 6,601,712 B2 | 8/2003 | Dean et al. | |
| 6,681,971 B2 | 1/2004 | Laverack et al. | |
| 6,684,667 B2 | 2/2004 | Young | |
| 6,715,449 B1 | 4/2004 | Jordan | |
| 6,736,300 B2 | 5/2004 | Deakin | |
| 6,748,630 B2 | 6/2004 | Livingston | |
| 6,766,929 B2 | 7/2004 | Karlsson | |
| 6,772,929 B1 | 8/2004 | Stein | |
| 6,863,199 B2 | 3/2005 | Child | |
| 6,868,998 B2 | 3/2005 | Dean | |
| 6,892,913 B1 | 5/2005 | Andersson | |
| 6,918,521 B2 | 7/2005 | Settelmayer et al. | |
| 6,938,782 B2 | 9/2005 | Dean et al. | |
| 7,004,365 B2 | 2/2006 | Ingram | |
| 7,032,415 B2 | 4/2006 | Young | |
| 7,121,122 B2 | 10/2006 | Levi | |
| 7,131,561 B2 | 11/2006 | Humes | |
| 7,270,241 B2 | 9/2007 | Nobili | |
| 7,322,780 B2 | 1/2008 | Hill | |
| D561,680 S | 2/2008 | Foley et al. | |
| D562,217 S | 2/2008 | Davis et al. | |
| 7,357,283 B2 | 4/2008 | Settelmayer | |
| 7,416,098 B2 | 8/2008 | Settelmayer et al. | |
| 7,424,813 B2 | 9/2008 | Wu | |
| 7,434,714 B2 | 10/2008 | Huang | |
| 7,454,932 B2 | 11/2008 | Hollier | |
| 7,481,344 B2 | 1/2009 | Näslund et al. | |
| D622,208 S | 8/2010 | Sautter et al. | |
| 7,780,050 B2 | 8/2010 | Tucker | |
| 7,810,686 B2 | 10/2010 | Ilgenfritz | |
| 7,815,083 B2 | 10/2010 | Clausen et al. | |
| 8,136,708 B2 | 3/2012 | Sautter et al. | |
| 8,210,407 B2 | 7/2012 | Sautter et al. | |
| 8,234,757 B2 | 8/2012 | Lesley | |
| 8,245,893 B2 | 8/2012 | Sautter et al. | |
| 8,556,555 B2 | 10/2013 | Lesley | |
| 2002/0053581 A1 | 5/2002 | Peschmann et al. | |
| 2002/0125282 A1 | 9/2002 | Laverack et al. | |
| 2005/0077335 A1 | 4/2005 | Bourne | |
| 2006/0060622 A1 | 3/2006 | Prenger | |
| 2006/0086766 A1 | 4/2006 | Settelmayer | |
| 2006/0249466 A1 | 11/2006 | Wang | |
| 2006/0273122 A1 | 12/2006 | Bogoslofski et al. | |
| 2006/0273124 A1 | 12/2006 | Bogoslofski | |
| 2006/0289577 A1 | 12/2006 | Malone | |
| 2007/0068200 A1 | 3/2007 | Roloff et al. | |
| 2007/0119887 A1 | 5/2007 | Foley | |
| 2007/0119888 A1 | 5/2007 | Chuang | |
| 2007/0164065 A1 | 7/2007 | Davis | |
| 2007/0251279 A1 | 11/2007 | Hollier | |
| 2008/0035689 A1 | 2/2008 | Murray et al. | |
| 2008/0190979 A1 | 8/2008 | Robins et al. | |
| 2008/0193265 A1 | 8/2008 | Sautter et al. | |
| 2009/0120981 A1 | 5/2009 | Sautter et al. | |
| 2009/0120982 A1 | 5/2009 | Sautter et al. | |
| 2009/0120983 A1 | 5/2009 | Magnusson | |
| 2010/0078454 A1 | 4/2010 | Sautter et al. | |
| 2011/0139841 A1 | 6/2011 | Sautter et al. | |
| 2012/0234881 A1 | 9/2012 | Sautter et al. | |
| 2013/0020361 A1 | 1/2013 | Sautter et al. | |
| 2013/0248568 A1 * | 9/2013 | Bogoslofski | B60R 9/08 |
| | | | 224/324 |
| 2014/0097219 A1 * | 4/2014 | Reiber | B60R 9/055 |
| | | | 224/310 |
| 2014/0191004 A1 | 7/2014 | Miyao et al. | |

FOREIGN PATENT DOCUMENTS

| | | |
|---|---|---|
| DE | 3543514 A1 | 6/1986 |
| DE | 3513875 A1 | 10/1986 |
| DE | 10007078 A1 | 8/2001 |
| EP | 0742120 A1 | 11/1996 |
| EP | 2303640 B1 | 9/2013 |
| FR | 2574875 A1 | 6/1986 |
| FR | 2684621 A1 | 6/1993 |
| JP | 2002052985 A | 2/2002 |
| JP | 2003011733 A | 1/2003 |
| NO | WO9717228 * | 5/1997 |
| WO | 8400931 A1 | 3/1984 |
| WO | 9708017 A1 | 3/1997 |
| WO | 2006020487 A2 | 2/2006 |

(56) References Cited

FOREIGN PATENT DOCUMENTS

WO        2009158358 A1    12/2009
WO        2012016170 A1    2/2012

OTHER PUBLICATIONS

U.S. Patent and Trademark Office, Office action regarding U.S. Appl. No. 12/493,106, Apr. 28, 2011, 16 pages.
The U.S. Receiving Office of WIPO, International Search Report and Written Opinion of the International Searching Authority regarding PCT Application No. PCT/US2015/010705, which shares the same priority as this U.S. application, dated May 6, 2015, 12 pages.
THULE SUP Taxi Paddleboard Carrier 810, retrieved from the Internet circa before Dec. 19, 2013 from http://www.thule.com/en-us/us/products/carriers-and-racks/water-sport-carriers/surf-boards-carriers/x-thule-sup-taxi-paddleboard-carrier-810-__-8109999, 2 pages.
THULE SUP Shuttle Paddleboard Carrier 811, retrieved from the internet circa before Dec. 19, 2013 from http://www.thule.com/en-us/us/products/carriers-and-racks/water-sport-carriers/surf-boards-carriers/x-thule-sup-shuttle-paddleboard-carrier-811-__-1683512, 2 pages.
INNO Boardlocker INA744, retrieved from the internet circa before Dec. 19, 2013 from http://www.innoracks.com/details/ina744/, 1 page.
The International Bureau of WIPO, International Preliminary Report on Patentability regarding PCT Application No. PCT/US2015/010705, which shares the same priority as this U.S. application, dated Jul. 21, 2016, 9 pages.

\* cited by examiner

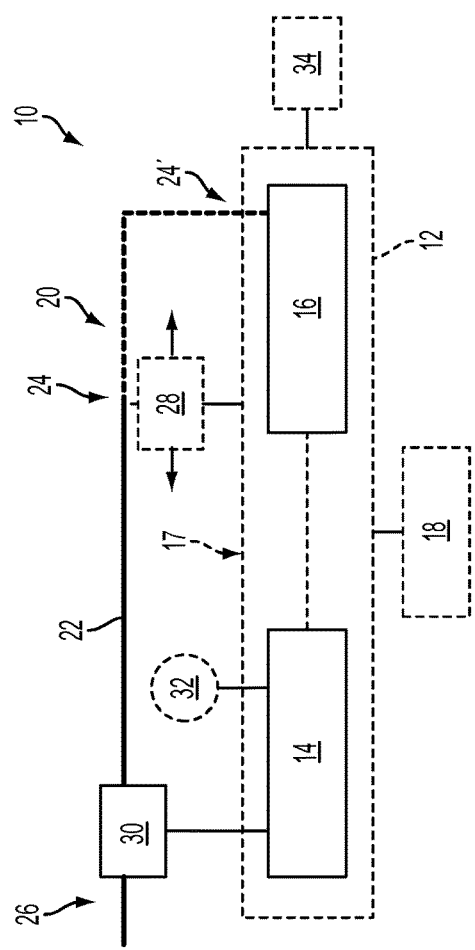
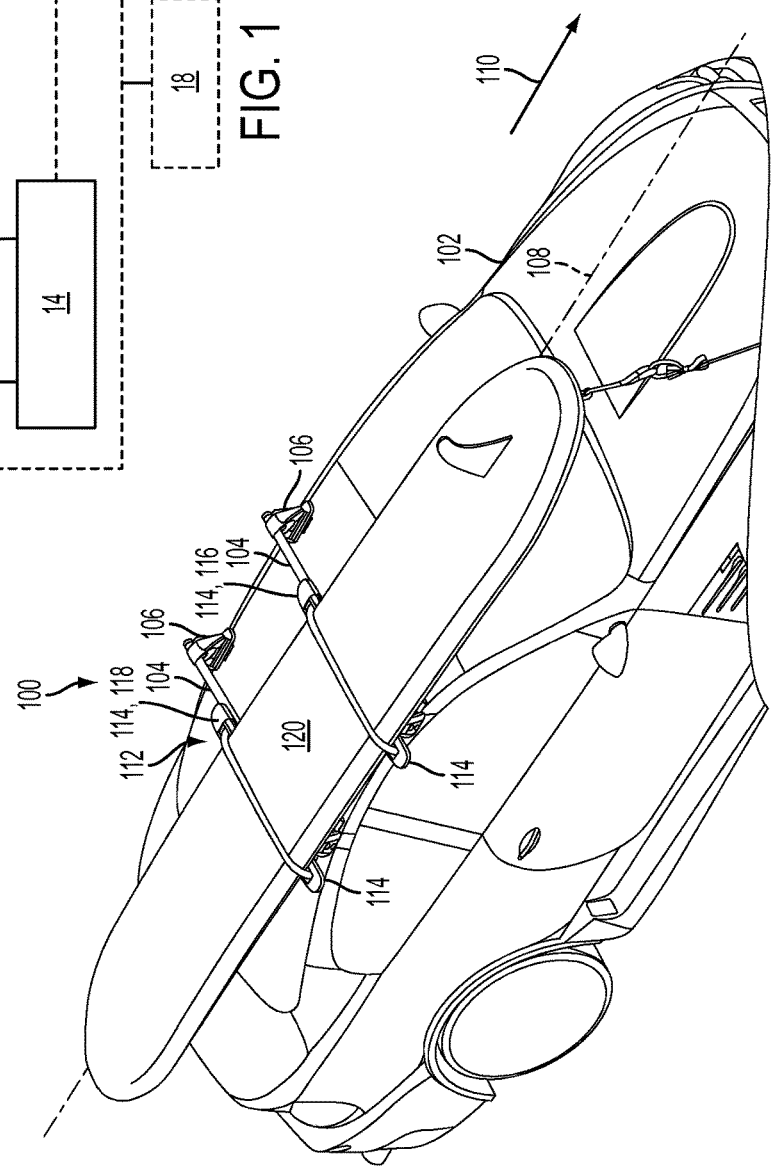
FIG. 1
FIG. 2

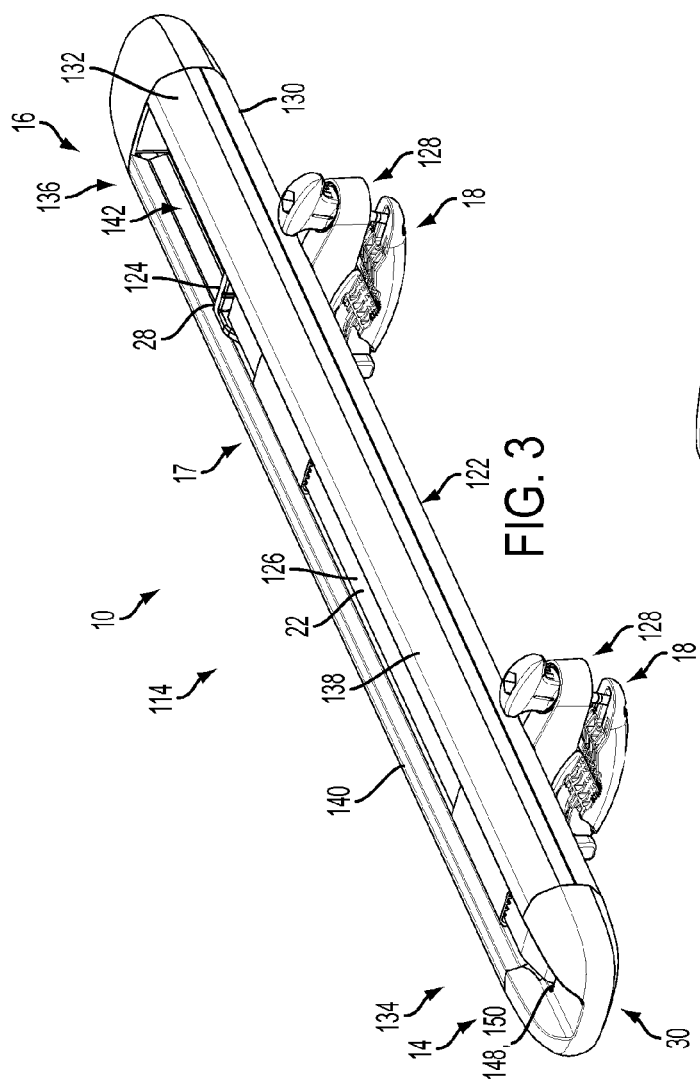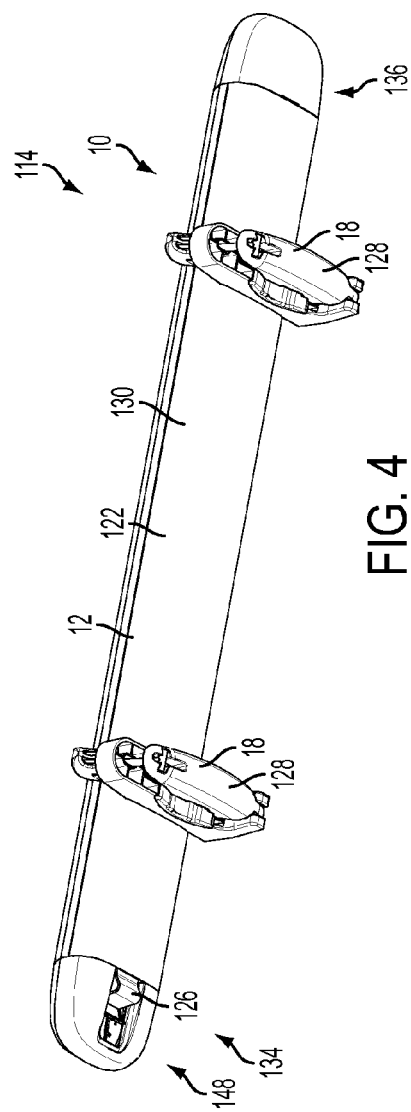

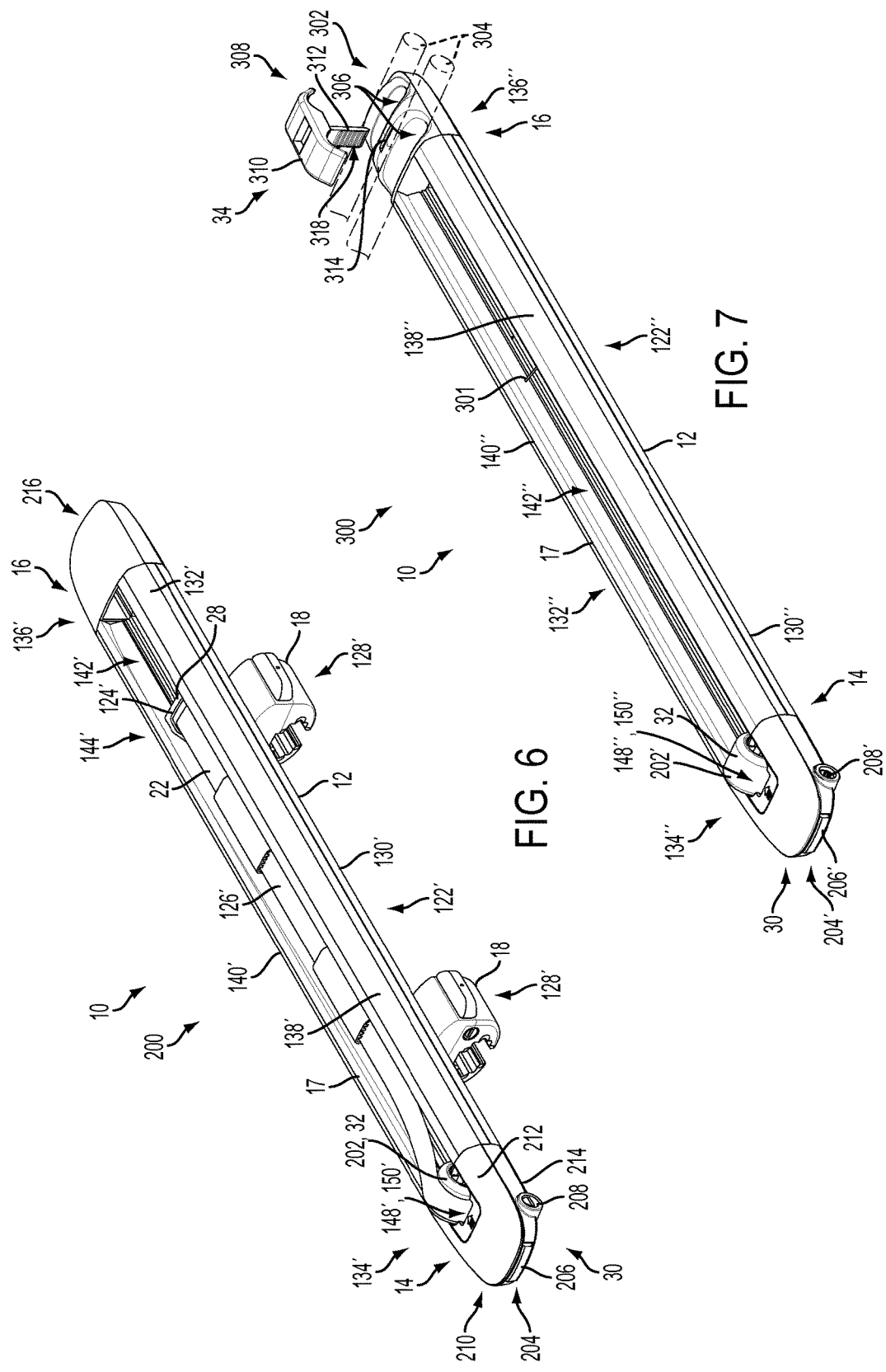

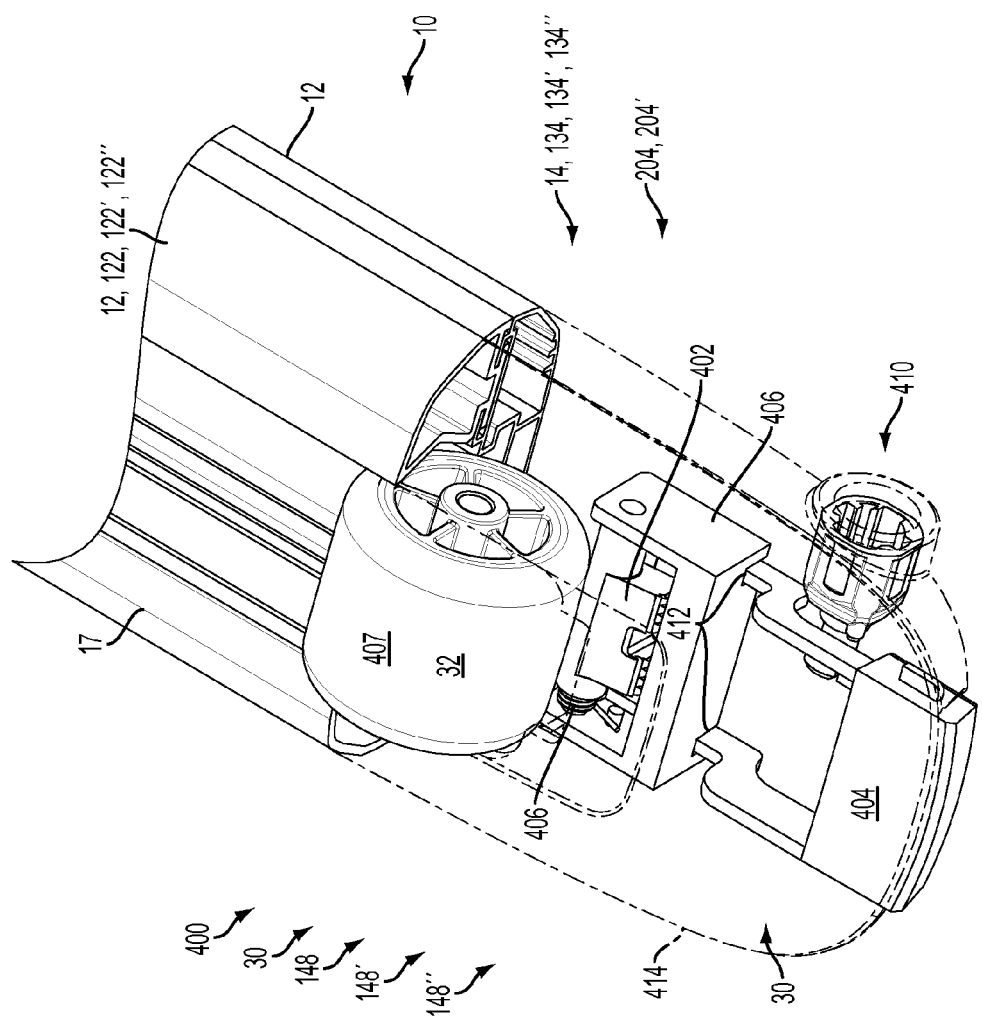

BOARD CARRIER

CROSS-REFERENCES

This application is based upon and claims the benefit under 35 U.S.C. §119(e) of U.S. Provisional Patent Application Ser. No. 61/925,094, filed Jan. 8, 2014. The complete disclosure of the above-identified patent application is hereby incorporated by reference for all purposes.

The following related applications and materials are incorporated herein, in their entireties, for all purposes: U.S. patent application Ser. No. 13/861,260; U.S. patent application Ser. No. 12/816,121; U.S. patent application Ser. No. 13/874,391. Others may be incorporated by reference throughout the following disclosure.

FIELD

This disclosure generally relates to cargo-specific rack accessories for vehicle rooftop racks. Specifically, it relates to accessories for carrying boards such as surf boards, stand up paddle (SUP) boards, and the like.

INTRODUCTION

The popularity of recreational and competitive stand up paddle (SUP) boarding or surfing has grown substantially in recent years. The sport originated in Hawaii and is known in the Hawaiian language as "hoe he'e nalu." As a result of the sport's rise since its introduction in the previous decade, and with the continuing success of standard surfing, using short and long surf boards, the demand for carriers to transport boards of varying dimensions and designs, on cars and other vehicles, has also risen significantly. Innovation is still needed to improve carrier designs for accommodating boards of different configurations, either one at a time or in multiples, in a stable and secure manner, while also facilitating easy loading and unloading.

SUMMARY

The present disclosure provide a board carrier system and related methods. In some embodiments, a rack for carrying a board on top of a vehicle (the vehicle having an elongate axis parallel to the direction of vehicular travel) may include a pair of coupling devices for attaching a crossbar to the vehicle, the crossbar being substantially perpendicular to the elongate axis of the vehicle. A support unit may have an elongate body, a clamp attached to a lower portion of the body for mounting the support unit to the crossbar with a long axis of the body parallel to the crossbar, a load-bearing surface on an upper portion of the body, and an end portion of the body including a buckle mechanism. A retainer may be movably attached to the support unit, the retainer configured to travel toward and away from the buckle mechanism along a path substantially parallel to the long axis of the body. An elongate strap may have a first end portion secured to the movable retainer and a second end portion opposite the first end portion. The buckle mechanism may be configured to releasably secure the second end portion of the strap.

In some embodiments, a cargo-specific rack accessory for carrying a board on top of a vehicle, the vehicle having an elongate axis parallel to the direction of vehicular travel, may include an elongate body having an upper load-bearing surface, a first end, and a second end. A traveling retainer may be attached to the body such that the retainer is capable of traveling freely along a length of the body alternately toward and away from the first end of the body. A strap may have a first end portion secured by the retainer and a second end portion opposite the first end portion. The strap and traveling retainer may be configured such that a securing width automatically adjusts to correspond to a board placed transversely on the body when the second end portion of the strap is placed over the board and pulled toward the first end of the body.

In some embodiments, a cargo-specific rack accessory may be included for carrying a board on top of a vehicle having an elongate axis parallel to the direction of vehicular travel. The accessory may include an elongate body having an upper load-bearing surface, a first end portion, and a second end portion. A strap may have a proximal end portion secured to the body and a distal end portion opposite the proximal end portion. The first end portion of the body may include a buckle and a roller assembly, the buckle configured to selectively secure the distal end portion of the strap, and the roller assembly having a generally cylindrical roller rotatable about an axis oriented transverse to a long axis of the body.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 1 is a schematic diagram of an illustrative board carrier support unit showing possible relationships between various components.

FIG. 2 is a perspective view of a SUP board secured to a vehicle rooftop rack using an illustrative board carrier in accordance with aspects of the present disclosure.

FIG. 3 is an overhead isometric view of an illustrative support unit with clamps attached.

FIG. 4 is a bottom isometric view of the support unit of FIG. 3.

FIG. 6 is an overhead isometric view of an illustrative support unit having an integrated roller.

FIG. 7 is an overhead isometric view of an illustrative support unit with the strap assembly removed and showing a paddle retention device at one end.

FIG. 8 is an isometric view of an illustrative end portion of a support unit, with a casing removed to show internal components of a strap retention mechanism.

DESCRIPTION

Overview

Figure 5:
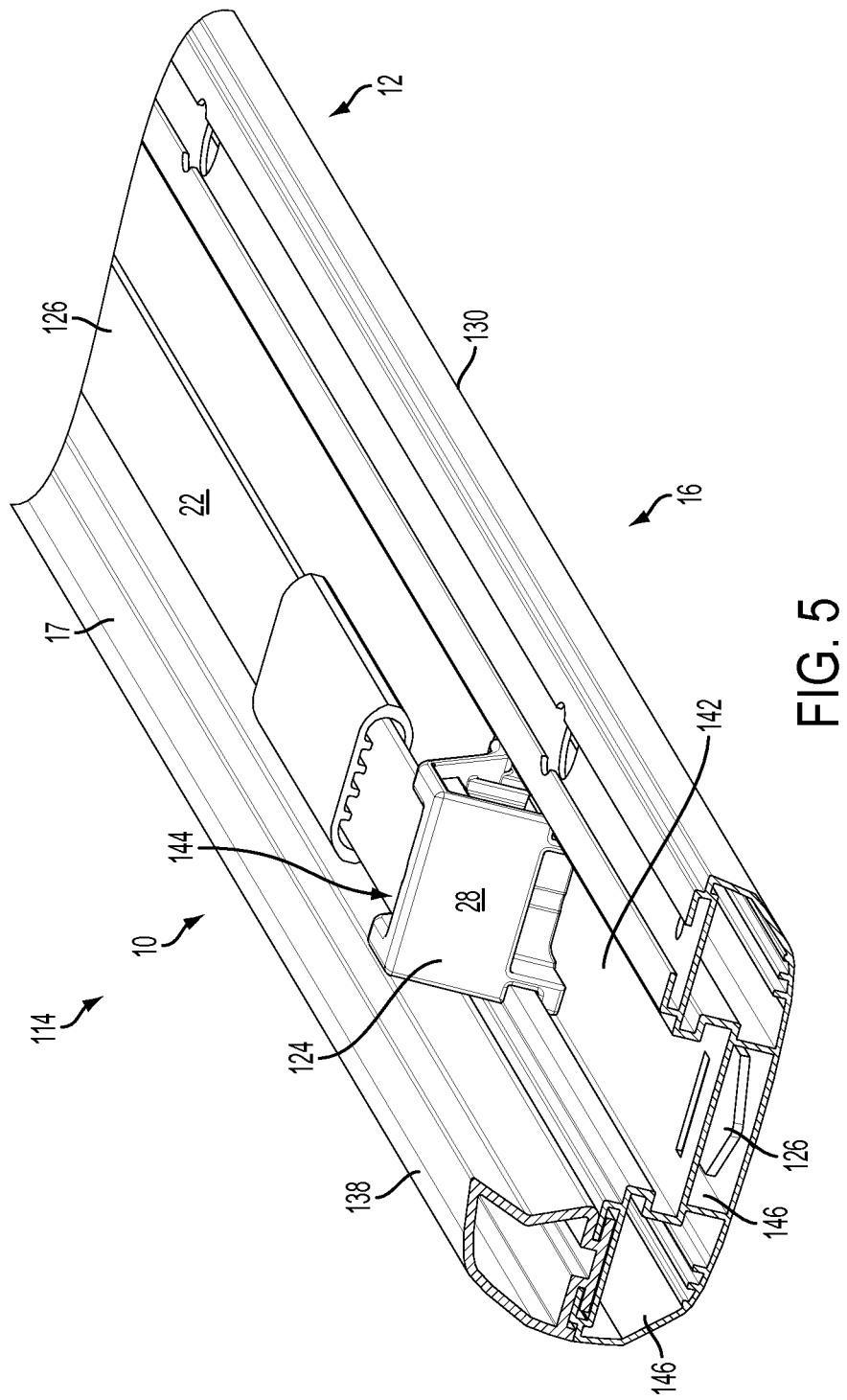
FIG. 5 is an isometric partial view of an illustrative support unit, showing a strap retention member slidably engaged in a channel of the support unit.

Various embodiments of carriers for surf boards, SUP boards, and the like are described below and illustrated in the associated drawings. Unless otherwise specified, a board carrier and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other embodiments and types of carriers. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Carrier systems for carrying boards, including but not limited to surf boards and SUP boards, on top of a vehicle are shown in the attached drawings, and described in detail below. These systems may be referred to as SUP board carrier systems, because they may accommodate SUP-style boards. However, it should be understood that other board types may also be carried. In general, a SUP board carrier system may include a pair of supports, also referred to as units, mounted on a rooftop rack of a vehicle, one support for the front portion of a board and one for a rear portion of the same board. In general, the terms "rear" and "front" may be interchangeable, as the SUP board carrier system may be mounted in either a front-facing or a rear-facing orientation, and/or front and rear supports may be essentially identical.

Turning to FIG. 1, an illustrative support 10 for use in a board carrier system is shown schematically. As mentioned above, support 10 may be interchangeably referred to as a unit or a support unit. Support 10 may include any suitable components configured to cradle, support, and secure an expected board such as a surf board or a SUP board. Support 10 may include an elongate body 12, having a first end portion 14 and a second end portion 16. Body 12 may be include any suitable structure configured to support and cushion the board, such as a rigid underlying structure having a resilient upper support surface 17 on which the board rests. Body 12 may be a single piece, or may include a plurality of portions, either connected or discrete, or any combination thereof. For example, a single elongate body may be mounted to a rooftop carrier system. In other examples, each end portion may be separate from the other, and each end portion may be mounted to a respective side of the rooftop carrier system, with a gap or space between the end portions.

Support 10 may include a clamp 18, which may be operatively connected to body 12, or any portion thereof. Clamp 18 may include any suitable structure configured to securely and removably mount support 10 to a vehicle rooftop, such as a clamp configured to attach to a crossbar.

Support 10 may include a strap assembly 20. Strap assembly 20 may include any suitable structure and/or device configured to secure the board to support surface 13 of body 12. For example, strap assembly 20 may include an elongate strap 22, secured at a first (proximal) end 24, 24' and adjustably securable at a second (distal) end 26. Strap 22 may be secured at first end 24 to second end portion 16 of body 12. In some embodiments, strap 22 may be secured at first end 24' to an adjustable retainer 28. Adjustable retainer 28 may include any suitable structure or apparatus configured to move or travel along a long axis of body 12, thereby adjusting the effective width, also referred to as the securing width, of the unit by adjusting the amount of support surface available to the board. In some examples, retainer 28 may be movably attached to the body such that the retainer is capable of traveling freely along a length of the body alternately toward and away from first end portion 14. In some examples, retainer 28 may be configured to slide or otherwise travel freely along a predefined linear path between the first and second end portions. For example, a board that is significantly narrower than body 12 may be supported. One long edge of the board may be placed closer to first end portion 14. Adjustable retainer 28 may then be relocated adjacent to the opposite edge of the board, thereby minimizing side to side slop or space under the retaining strap.

Distal end 26 of strap 22 may be removably and/or adjustably securable at first end portion 14, such as by a securing mechanism 30 located near, integrated in, or connected to the first end portion. Securing mechanism 30 may include any suitable structure and/or device configured to receive a selected length of strap 22 and prevent the length of strap from being withdrawn unintentionally. For example, securing mechanism 30 may include an adjustable snap-fit buckle, a traditional frame and prong buckle to interface with corresponding holes in strap 22, a cam-release buckle, or any other mechanism for releasably securing a strap at a selected length. In some embodiments, securing mechanism 30 may be integrated into an end portion of the device. In some embodiments, securing mechanism 30 may be attached to the end portion or body 12, such as by a lanyard, strap, chain, or the like.

In some embodiments, distal end 26 of strap 22 may be permanently or non-adjustably secured at first end portion 14 by a non-releasable securing mechanism 30. In these embodiments, an adjustment mechanism may be employed at an intermediate portion of the strap, to snug the strap to a supported board. In other words, the overall effective length of the strap may be adjusted, rather than the position at which the strap is secured.

Support unit 10 may include a roller 32 at first end portion 14. Roller 32 may include any suitable rotating or low-friction structure configured to support the weight of an expected board and to facilitate supported sliding of the board onto body 12 from one side of the unit during a loading process. For example, roller 32 may include a generally cylindrical roller having a central axle oriented perpendicular to the long axis of the overall support unit. Some or all of roller 32 may project above the upper profile of body 12, such that a board being loaded can roll on the roller without experiencing the full friction of the upper support surface. In some embodiments, roller 32 may include a non-rotating portion with a lower coefficient of friction than support surface 17, such that the board may be loaded with sliding support rather than rolling support.

Support unit 10 may include a paddle holder 34 adjacent to second end portion 16. Paddle holder 34 may include any suitable structure and/or device configured to releasably secure one or more paddle handles to the unit. In some embodiments, paddle holder 34 may be configured to work in tandem with a second such holder 34 on a second unit, such that the elongate paddle handle is supported similarly in two locations adjacent to a long edge of the board, if one is installed.

A SUP or other board may be carried atop a vehicle by one or more support units 10. For example, a pair of support units 10 may be mounted to crossbars of a rooftop rack using clamps 18. Strap 22 may be released from securing mechanism 30, and retainer 28 may be slid as far as possible toward second end portion 16. The board may then be loaded by placing a first long edge of the board onto both rollers 32 (if provided) and locating the board squarely onto support surfaces 17. The board may be placed such that the second long edge of the board is adjacent to securing mechanisms 30. Straps 22 may then be placed over the board and distal ends 26 may be inserted into the securing mechanisms. Tightening the straps will then cause retainers 28 to travel or slide toward respective first end portions 14 and securing mechanisms 30. This action results in a snug fit of the strap over the board. Securing mechanisms 30 (e.g., buckles) may be lockable, in which case straps 22 may be locked in place such that each strap is not removable from its buckle. One or more paddles may be cradled or otherwise supported and secured by paddle holders 34, which may also be lockable.

Accordingly, a method for securing a board to a rooftop rack on a vehicle may include placing a board on top of a vehicle roof rack. The roof rack may include a first support unit and a second support unit, each oriented perpendicular to an elongate axis of the vehicle and each including an upper load bearing surface. Placing the board may result in a major face of the board contacting the load bearing surfaces of both the first and the second support units. At each support unit, a strap may be passed over the board, the strap being connected at one end to a retainer member that is slidably connected to the support unit. The retainer member may be free to slide along the support unit in a direction perpendicular to the elongate axis of the vehicle. The strap may be adjusted the strap on the board by pulling on a free end to cause the retainer member to slide into a position corresponding to a width of the board. The free end of the strap may be secured in a buckle mechanism at an end portion of the support unit. The method may further include placing the board onto rollers protruding above the respective upper load bearing surfaces of the first and second support units.

In some embodiments, a support unit for supporting a board, such as a SUP board, surf board or the like, may include an elongate body having an upper load-bearing surface, a first end, and a second end. A travelling retainer may be attached to the body, such that the retainer is capable of traveling freely along a length of the body alternately toward and away from the first end of the body. A strap may have a first end portion secured by the retainer and a second end portion opposite the first end portion. The strap and travelling retainer may be configured such that a securing width automatically adjusts to correspond to a board placed transversely on the body when the second end portion of the strap is placed over the board and pulled toward the first end of the body.

EXAMPLES, COMPONENTS, AND ALTERNATIVES

The following examples describe selected aspects of exemplary board carriers, as well as related systems and/or methods. These examples are intended for illustration and should not be interpreted as limiting the entire scope of the present disclosure. Each example may include one or more distinct inventions, and/or contextual or related information, function, and/or structure.

Example 1

This Example describes an illustrative board carrier system having a self-adjusting strap. The board carrier system of this Example includes one or more embodiments of the board carrier support 10 described above; see FIGS. 2-5.

FIG. 2 shows an illustrative vehicle rooftop rack 100 mounted to an illustrative vehicle 102. The rack 100 may include a pair of rails running along the sides of the vehicle roof, with a pair of crossbars 104 attached to the rails by coupling devices 106 (e.g., towers, feet). In some examples, such as the one shown in FIG. 2, the coupling devices are connected to a portion of the vehicle itself rather than separate rails. In general, the vehicle has an elongate axis 108 running in the direction of vehicle travel 110. Crossbars 104 are typically installed perpendicular to or at least transverse to that elongate axis 110, as shown in FIG. 2. The rack shown in FIG. 2 has crossbars 104 with a round cross section. Crossbars 16 may have any suitable cross section. For example, crossbars may be round, square, rectangular, teardrop-shaped, aerodynamic or wing-shaped, oval, or any other suitable shape.

A SUP board carrier system 112 may be mounted to a rooftop rack such as the one depicted in FIG. 2, or to many other types of rooftop racks. In this Example, system 112 includes two support units 114, with a first support unit 116 attached to one of the crossbars and a second support unit 118 attached to the other crossbar, forming a cradle for a SUP board 120 or similar object. Support units 114 and 116 are embodiments of carrier support 10, described above. As described further below, one or more mounts or clamps may be used to facilitate attachment of SUP board carrier system 112 to crossbars 104.

Referring now to FIGS. 3-4, an illustrative SUP board carrier system 112 may include one or more support units 114. Each support unit 114 may include any suitable components configured to cradle, support, and secure an expected board. In the example shown in FIGS. 3 and 4, support unit 114 may include an elongate body 122, a retainer member 124, and an elongate strap 126, as well as one or more mounting clamps 128 depending from the body for attaching the unit to a crossbar.

Elongate body 122 may include any suitably shaped and sized structure configured to support the weight and contour of a SUP board or similar object placed thereon with the body spanning the width of the board. In some examples, elongate body 122 may be made up of multiple associated sections or pieces, which may or may not be physically connected to each other, as explained above. In some examples, body 122 may be unitary or monolithic in nature. In the example shown in FIGS. 3-4, body 122 includes a rigid structural base 130, which may be extruded aluminum or the like, and a load-bearing upper surface 132, which may include a resilient pad and/or other supportive structures such as elastomeric cushions configured to conform to the board. Body 122 may include a first end portion 134 and a second end portion 136, each of which may include suitable structures to enclose the end to make it more aerodynamic and/or aesthetically pleasing, as well as to support internal components, if present.

With continuing reference to FIGS. 3 and 4, and with additional reference to FIG. 5, retainer member 124 may include any suitable structure configured to be attached to the support unit and movable relative to the body. Retainer member 124 may be interchangeably referred to as a retainer, retaining member, anchor, anchor block, retainer block, anchor member, and/or anchoring member. In the example of support unit 114, upper surface 132 includes resilient pads 138 and 140, which border a central channel 142 formed in base 130. Retainer member 124 may be configured with a shaped bottom portion that is retained by and slides within channel 142.

One or more mechanical stops (not shown) may be included in the channel or related structures to limit the range of motion of the sliding retainer member. For example, a mechanical stop may be included at an intermediate position in the channel, blocking anchor member 124 from travelling farther away from second end portion 136 toward first end portion 134. This arrangement limits the travel of anchor member 124 to an path having a length shorter than the overall length of channel 142, facilitating tightened storage of strap 126 flat against the bottom of channel 142 and/or simplifying adjustability of the strap when in use by preventing over-adjustment of the anchor to positions unsuitable for expected board widths. Travel may be limited to any desired length of channel. For example, a mechanical stop may be include such that travel is limited to a range equivalent to one-third or one-half of the length of channel 142. In some embodiments, travel of retainer member 124 may be limited to approximately six inches. In some embodiments, travel of retainer member 124 may be confined to a range equivalent to approximately ten to approximately fifty percent of the length of the body. In some embodiments, a position of the mechanical stop may be adjustable along the length of the channel. An example of a mechanical stop is shown and described further below with respect to FIG. 7 (see Example 3). Additionally or alternatively, channel 142 may extend across a fraction of the length of body 122, rather than across the entire length. For example, channel 142 may be formed only partially across body 122. For example, a length of channel may extend approximately one-third of the length of body 122, adjacent to second end portion 136.

Retainer member 124 may include a strap attachment portion 144 configured to provide a secure attachment point for affixing strap 126 to retainer member 124. In some examples, the attachment portion may include a spindle, rod, pin, slot, rivet, boss, clamp, or the like. When the strap is attached to the sliding member, the attached end of the strap is then capable of sliding with the member along the channel.

The extruded structure of base 130 may include one or more longitudinal tunnels, cavities, enclosed pathways, and/or recesses 146 passing lengthwise through at least a portion of the structure. One such longitudinal recess may be suitably configured to receive a portion of strap 126, thereby securing the portion of strap that may otherwise cause noise and wear issues during vehicle travel (see FIGS. 4 and 5). In other words, one recess 146 may be configured to retain an excess portion of the strap extending beyond the buckle mechanism.

Strap 126 may include any suitable elongate, flexible structure configured to secure a board atop body 122 by passing over the board and being secured at both ends to the support unit. Strap 126 may include a fabric, a braided fiber, and/or other material, or any combination thereof, and may include steel or other metal components and/or a protective coating, covering, or pad. In some examples, strap 126 may be cut-resistant. In the examples shown in FIGS. 2-5, strap 126 is affixed at a first end portion to retainer member 124 at attachment portion 144. Strap 126 includes a length of strap terminating in a second or distal end portion that is releasably attachable at one end portion of body 122. In use, this attachment is on an opposite side of the SUP board from the retainer member. Suitable straps may be described in U.S. patent application Ser. No. 13/895,273 and U.S. Pat. No. 8,234,757, the entireties of which are hereby incorporated herein for all purposes.

The second or distal end portion of strap 126 may be releasably secured by any suitable device or structure, corresponding to securing mechanism 32 described above. In some embodiments, such as the one shown in FIGS. 3-4, a cam-style buckle mechanism 148 is included at an end portion of body 122 and used to secure the strap.

In the example shown, buckle mechanism 148 is disposed in or adjacent to an aperture 150 formed in support unit 114 and sized to allow strap 126 to pass therethrough. Buckle mechanism 148 may include any suitable device that secures the position of strap 126. In some examples, buckle mechanism 148 may include a cam-style buckle, in which a lever portion may be operated to release or secure the strap. In these examples, buckle mechanism 148 may have an engaged position, in which the strap is allowed to move through the buckle in only one direction. For example, the strap could be tightened, but would be prevented from loosening by a portion of the buckle that engages with the strap in a frictional and/or toothed manner, and may pinch the strap against another structure. Buckle mechanism may be placed into a released position, such as by operating the lever portion by hand, which would disengage the buckle from the strap and allow strap motion in both the loosening and tightening directions.

Another embodiment of securing mechanism 32 and buckle 148 is described in further detail below (see Example 3).

Clamps 128 may be attached to a surface of body 122 such as base 130. Clamps 128 may include any suitable devices or structures configured to removably mount support unit 114 to crossbar 104. In some examples, clamps 128 may include clamshell-style clamps, where the clamp includes a first jaw portion hinged to a second jaw portion, with a securing device for adjusting and/or holding the clamp in a securing position. An example of this style of clamp is shown in FIGS. 3-4. In some examples, clamps 128 may include horizontal-style clamps, where the clamp includes a fixed jaw stationarily attached to body 122 and a movable jaw configured to move alternately toward and away from the fixed jaw. An example of this style of clamp is shown in FIG. 6. Suitable examples that may be used as clamps 128 are disclosed in U.S. patent application Ser. No. 12/816,121 and U.S. Pat. No. 7,357,283, the entireties of which are hereby incorporated herein for all purposes.

Example 2

Figure 10:
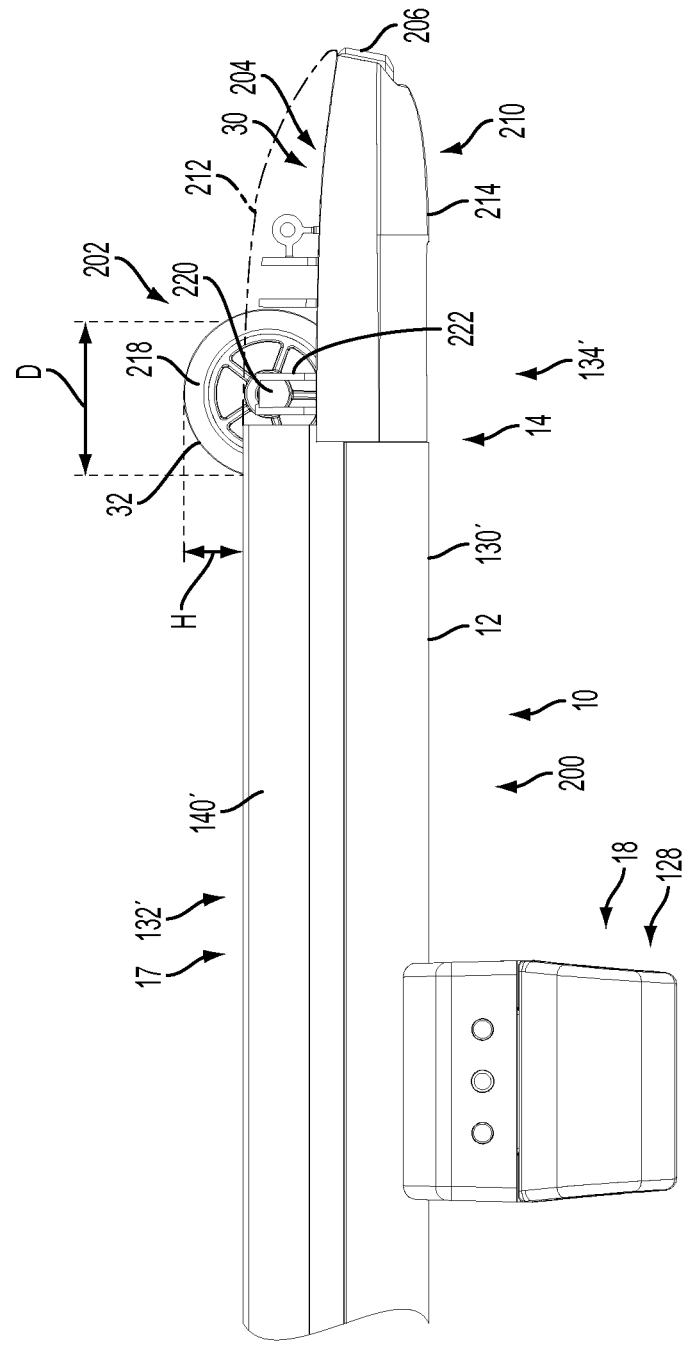
FIG. 10 is an elevation view of a portion of an illustrative support unit, showing relative positions of selected components.

This Example describes an illustrative board carrier support having an integrated roller; see FIGS. 6 and 10.

FIG. 6 is an isometric view of another embodiment of support 20 similar to support unit 114, generally indicated at 200. Support unit 200 has many of the same features and components described above regarding unit 114. Corresponding features are indicated using prime versions of the reference numbers used in Example 1. Support unit 200 may include additional or alternative components that will be identified and described in more detail.

As described regarding unit 114, unit 200 includes a body 122' comprising base 130' and an upper load-bearing surface 132' that may include a first resilient pad 138' and a second resilient pad 140' on either side of a central channel 142'. Body 122' has a first end portion 134', a second end portion 136'. Unit 200 includes a strap 126' secured at a proximal end portion by an attachment portion 144' of a retainer 124' and securable at a distal end portion by a securing mechanism 148' (e.g., a buckle) and aperture 150'. A pair of clamps 128' depend from base 130' for securing the unit to a crossbar or the like.

Furthermore, in the embodiment shown in FIG. 6, first end portion 134' of support unit 200 includes a roller assembly 202 and buckle 148' includes a lockable strap retention mechanism 204. Roller assembly 202 may include any suitable load-bearing device or structure configured to aid in the loading of a SUP board from a side of the vehicle, for example by providing a rolling support under the board as it is positioned transverse to the support unit. For example, roller assembly 202 may include a generally cylindrical roller rotatable on an axle oriented perpendicular to a long axis of unit 200. In the example shown in FIG. 6, roller assembly 202 includes a standard wheel-type roller having an axis oriented parallel to the elongate axis of the vehicle, i.e., perpendicular to the long axis of the crossbar. Other reduced-friction weight-bearing devices may be included. In some embodiments, a roller may be disposed, additionally or alternatively, on second end portion 136'. In this Example, roller assembly 202 is disposed inboard of aperture 150'. In other words, the roller is between the vehicle's centerline or elongate axis and the aperture associated with buckle mechanism 148'. In other words, the roller is disposed between the buckle assembly and the center of the support unit.

Lockable strap retention mechanism 204, an example of which is described in greater detail below, includes a pushbutton release 206 and a lock mechanism 208 configured to selectively prevent operation of release 206. See Example 3.

Each end portion of support unit 200 includes an enclosure or housing. More specifically, first end portion 134' includes an end cap 210 having an upper cover 212 and a lower cover 214. Second end portion 136' includes a similar end cap 216, as shown in FIG. 6. End caps 210 and 216 may include any suitable structures configured to provide improved wind resistance and/or esthetics as well as support for internal structures and components as described throughout this disclosure. Some or all of each end cap may be permanently and/or rigidly attached to body 122'.

Turning to FIG. 10, first end 134' of support unit 200 is shown in an elevation view, with upper end cover 212 drawn in phantom lines to allow illustration of possible relationships between selected components of roller assembly 202. Roller assembly 202 may include roller 218, which may be rotatable about an axle 220. Axle 220 may include any suitable structure or structures configured to allow free rotation of roller 218. Axle 220 may include a single elongate member, or may include a plurality of members. For example, axle 220 may include a single, elongate pin constructed of a rigid material such as metal. In the embodiment shown in FIG. 10, axle 220 is supported by an axle support 222, which extends vertically from unit 200. In this example, axle support 222 is an extension of lower end cover 214.

Roller 218, as described above, may include any suitable rotating structure. In the embodiment shown in FIG. 10, roller 218 is generally cylindrical, and is configured to rotate about axle 220 in a direction along the long axis of unit 200. This arrangement, in which axle 220 is oriented transverse to the long axis of unit 200, facilitates loading of a board from one end of the support unit, such as when loading a board onto an installed carrier system from the side of a vehicle. To further facilitate such functionality, roller 218 may have a diameter D and be mounted on structure 222 such that the roller extends above support surface 132', by a height H.

Roller 218 may comprise any suitable material, and have any suitable dimensions. Materials that have been found suitable include a rigid plastic roller having an elastomer overmold, which may result in a coefficient of friction of approximately 0.71. Suitable dimensions include a roller that is approximately 40 mm wide, with an approximately 45 mm diameter D. Roller 218 may extend or protrude above support surface 132' (or a plane generally defined by the upper load-bearing surface) by any suitable amount, such as by height H of approximately 15 mm.

Example 3

Figure 9:
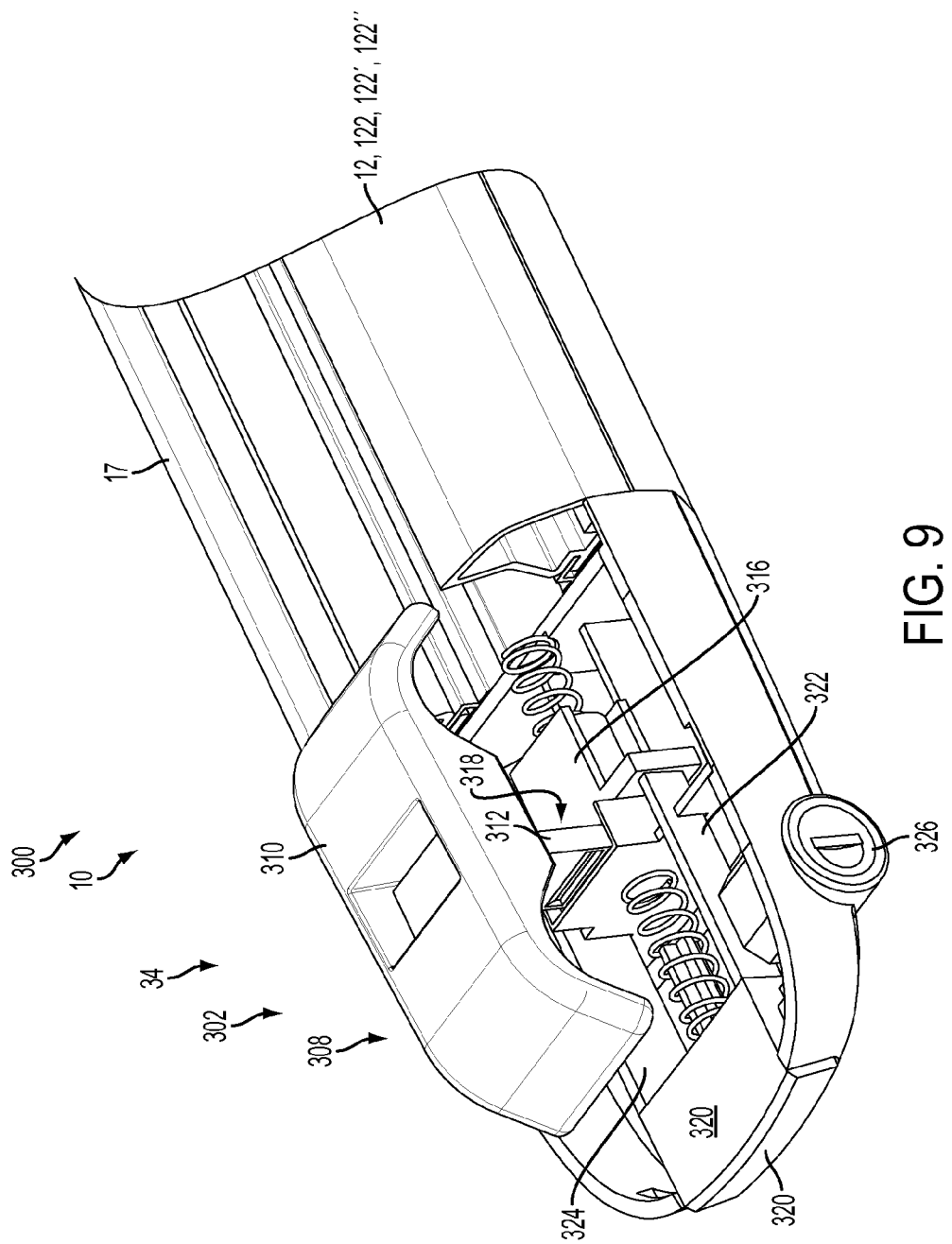
FIG. 9 is an isometric view of an illustrative end portion of a support unit, with a casing removed to show internal components of a paddle retention device.

This example describes an illustrative board carrier support having integrated features in the form of a roller assembly, a lockable buckle, and a paddle carrier, and further describes embodiments of such integrated features; see FIG. 7-9.

FIG. 7 is an isometric view of another embodiment of support 20 similar to support units 114 and 200, generally indicated at 300. Support unit 300 has many of the same features and components described above regarding units 114 and 200, although certain components have been removed for efficiency of description. Corresponding features are indicated using primed versions of the reference numbers used in Example 2. Support unit 300 may include additional or alternative components that will be identified and described in more detail.

As described regarding units 114 and 200, unit 300 includes a body 122" comprising base 130" and an upper load-bearing surface 132" that may include a first resilient pad 138" and a second resilient pad 140" on either side of a central channel 142". Body 122" has a first end portion 134", a second end portion 136". Unit 300 may include a strap (not shown) securable at a distal end portion by a securing mechanism 148" (e.g., a buckle) and aperture 150".

The proximal end (opposite the distal end) of the strap is secured to a movable anchor, such as retainer members 124 and 124'. As described in Example 1, a mechanical stop 301 may be included in the channel to limit the range of travel of the retainer member. In this Example, mechanical stop 301 includes a rigid pin extending across channel 142". Stop 301 is fixed at a suitable location and height above the floor of channel 142" such that a mechanical stop would be blocked by the pin, preventing further travel toward first end portion 134".

In the embodiment shown in FIG. 7, first end portion 134" of support unit 300 includes a roller assembly 202', and buckle 148" includes a locking feature, such as a lockable strap retention mechanism 204'. Lockable strap retention mechanism 204' includes a pushbutton release 206' and a lock mechanism 208'.

An embodiment of lockable strap retention mechanism 204 and 204' is illustrated in FIG. 8 and generally indicated at 400. Lockable strap retention mechanism 400 may include a spring-biased cam portion 402, a cam actuator pushbutton 404 (corresponding to release 206/206'), and a guide housing 406. Mechanism 400 may be disposed adjacent to a roller 407, such that roller 407 is inboard of mechanism 400 as shown in FIG. 8. In some embodiments, roller 407 may be located elsewhere, such as outboard of or above mechanism 400.

Cam portion 402 may include any suitable strap engagement mechanism configured to secure the strap between the cam portion and a surface of guide housing 406. Similar to buckle mechanism 148 of support unit 114, cam portion 402 and guide housing 406 may combine to prevent motion of a strap (not shown) in at least one direction (e.g., loosening) when the cam portion is engaged and pinching the strap.

Pushbutton 404 may be actuated manually to release or disengage cam portion 402 from the strap by pivoting the cam portion against the biasing of an associated spring 408 or other biasing mechanism. Pushbutton 404 may be lockable using a lock mechanism 410 (corresponding to lock 208/208'). Lock mechanism 410 may include any suitable device or structure configured to selectively prevent pushbutton 404 from repositioning and thereby releasing the strap. For example, lock mechanism 410 may include a key-operated lock core having a member that rotates into an interfering position with respect to the pushbutton when turned by a key.

Guide housing 406 may include guide apertures or slots 412, configured to guide an actuating portion of pushbutton 404 toward cam portion 402. A cap or housing 414, shown in phantom, may be included to enclose and support the aforementioned components of mechanism 400, as shown in FIG. 8.

Returning now to FIG. 7, second end portion 136" of support unit 300 includes a paddle carrier 302, alternatively referred to as a paddle support assembly. Paddle carrier 302 may include any suitable structure or device configured to support and retain one or more paddles 304 (shown in phantom outline) associated with a SUP board. As shown in FIG. 7, paddle carrier 302 may be integrated with or attached to the support unit. Alternatively, paddle carrier 302 may be a separate, standalone, cargo specific rack accessory. In this Example, paddle carrier 302 includes one or more recesses 306 contoured and configured for cradling a paddle shaft, and a bail 308. Bail 308 is configured to selectively (e.g., releasably) secure paddle shaft(s) 304 to recesses 306. If more than one recess 306 is provided, the recesses may be disposed at different heights in order to help prevent interference of the wider paddle ends of retained paddles 304. If two support units are mounted on a vehicle, recesses may be aligned such that a recess in a front support unit will be in line with a corresponding recess in a rear support unit, thereby allowing a single paddle shaft to be retained by two paddle carriers.

Bail 308 may include any suitable structure configured to hold or secure paddle shaft(s) 304 in the recesses. Bail 308 may be comprised of a tough, hardened, and/or cut-resistant material or combination of materials. In some embodiments, bail 308 may include a hinged, rigid strap. In this Example, and with specific reference to FIGS. 7 and 9, bail 308 includes T-shaped holder having a retention portion 310 and a lockable, ratcheting dagger or spine portion 312.

Retention portion 310 may be pivotable within a limited range relative to spine portion 312 to accommodate the different heights of retained paddle shafts. Retention portion 310 may be lined with a resilient material to improve its grip on paddle shafts 304 without damaging the shafts.

Bail 308 may be configured such that the bail is removable from an aperture 314 in unit 300. Aperture 314 contains a bail retention mechanism 316. Spine portion 312 of bail 308 may include a toothed or stepped surface 318, which may be formed by recesses in the spine. This allows the spine portion to have a smooth side profile for insertion and removal from aperture 314, while also allowing a correspondingly toothed or stepped portion of bail retention mechanism 316 to mate with the spine portion. The toothed or stepped surface 318 of spine portion 312 may be replicated on both major faces of the spine, such that the bail may be inserted into aperture 314 in either orientation. Because the toothed portions of spine 312 and mechanism 316 are angled in one direction (i.e., ratcheting), the spring-biased toothed portion of mechanism 316 allows spine 312 to be inserted without significant interference. However, the toothed portion of mechanism 316 prevents removal of bail 308 unless the toothed portion is disengaged from the spine by an actuating pushbutton 320. Pushbutton 320 (also referred to as a pushbutton release) is configured to overcome the spring bias of mechanism 316 and release the bail. This is accomplished by causing side legs 322 and 324 to push mechanism 316 away from spine 312. A locking mechanism 326 may be included to lock the bail in place on the paddles by selectively preventing the repositioning of pushbutton release 320.

Example 4

This section describes additional aspects and features of a board carrier system in accordance with aspects of the present disclosure, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

1. A rack for carrying a board on top of a vehicle having an elongate axis parallel to the direction of vehicular travel, the rack comprising:

a pair of coupling devices for attaching a crossbar to the vehicle, the crossbar being substantially perpendicular to the elongate axis of the vehicle;

a support unit having an elongate body, a clamp attached to a lower portion of the body for mounting the support unit to the crossbar with a long axis of the body parallel to the crossbar, a load-bearing surface on an upper portion of the body, and an end portion of the body including a buckle mechanism;

a retainer movably attached to the support unit, the retainer configured to travel toward and away from the buckle mechanism along a path substantially parallel to the long axis of the body; and an elongate strap having a first end portion secured to the movable retainer and a second end portion opposite the first end portion;

wherein the buckle mechanism is configured to releasably secure the second end portion of the strap.

2. The rack of paragraph 1, the body further including a central channel running parallel to the long axis of the body, wherein the movable retainer is slidably retained by the channel.

3. The rack of paragraph 2, wherein the load-bearing surface comprises two resilient elastomer pads disposed on opposite sides of the central channel.

4. The rack of paragraph 1 or 2, wherein the clamp comprises a fixed jaw stationarily attached to the body of the support unit and a movable jaw configured to move alternately toward and away from the fixed jaw.

5. The rack of any of paragraphs 1-4, wherein the clamp comprises a first jaw portion hingedly attached to a second jaw portion.

6. The rack of any of paragraphs 1-5, wherein the buckle mechanism comprises a releasable cam portion configured to prevent relative motion of the strap in one direction when engaged and to allow relative motion of the strap in two directions when released.

7. The rack of any of paragraphs 1-6, wherein the end portion of the body is a first end portion, the body further including a second end portion, and wherein the retainer member is configured to slide freely along a predefined linear path between the first and second end portions.

8. The rack of paragraph 7, wherein the second end portion includes a paddle carrier.

9. The rack of paragraph 8, wherein the paddle carrier includes a first recess for cradling a paddle shaft, and a bail configured to releasably secure the paddle shaft to the first recess.

10. The rack of paragraph 9, further including a second recess disposed at a different height than the first recess.

11. The rack of paragraph 9, wherein the bail is lockable to prevent release of a paddle secured in the paddle carrier.

12. The rack of any of paragraphs 1-11, wherein the load-bearing surface comprises a resilient elastomer pad.

13. The rack of any of paragraphs 1-12, further comprising a roller operatively attached to the end portion of the body.

14. The rack of paragraph 13, wherein the roller is disposed adjacent to the buckle mechanism and configured to rotate about an axis perpendicular to the long axis of the elongate body of the support unit.

15. The rack of paragraph 14, wherein the roller is disposed between the center of the body and the buckle mechanism.

16. The rack of any of paragraphs 1-15, the support unit further including a recess configured to retain an excess portion of the strap extending beyond the buckle mechanism.

17. The rack of any of paragraphs 1-16, wherein the buckle mechanism is lockable to prevent release.

18. The rack of any of paragraphs 1-17, wherein the support unit is a first support unit, the crossbar is a first crossbar, and the rack further includes a second support unit mounted to a second crossbar.

19. A method for securing a board to a rooftop rack on a vehicle, the method comprising:
  placing a board on top of a vehicle roof rack including a first support unit and a second support unit each oriented perpendicular to an elongate axis of the vehicle and each including an upper load bearing surface, with a major face of the board contacting the load bearing surfaces of both the first and the second support units;
  at each support unit: passing a strap over the board, the strap being connected at one end to a retainer member that is slidably connected to the support unit such that the retainer member is free to slide along the support unit in a direction perpendicular to the elongate axis of the vehicle; adjusting the strap on the board by pulling on a free end to cause the retainer member to slide into a position corresponding to a width of the board; and securing the free end of the strap in a buckle mechanism at an end portion of the support unit.

20. The method of paragraph 19, wherein the placing step includes placing the board onto rollers protruding above the respective upper load bearing surfaces of the first and second support units.

21. A cargo specific rack accessory for carrying a board on top of a vehicle having an elongate axis parallel to the direction of vehicular travel, the accessory comprising:
  an elongate body having an upper load-bearing surface, a first end, and a second end;
  a traveling retainer attached to the body such that the retainer is capable of traveling freely along a length of the body alternately toward and away from the first end of the body; and
  a strap having a first end portion secured by the retainer and a second end portion opposite the first end portion;
  wherein the strap and traveling retainer are configured such that a securing width automatically adjusts to correspond to a board placed transversely on the body when the second end portion of the strap is placed over the board and pulled toward the first end of the body.

22. The accessory of paragraph 21, further including a buckle mechanism disposed near the first end of the body, the buckle mechanism being configured to secure the second end portion of the strap.

23. A cargo specific rack accessory for carrying a board on top of a vehicle having an elongate axis parallel to the direction of vehicular travel, the accessory comprising:
  an elongate body having an upper load-bearing surface, a first end portion, and a second end portion;
  a strap having a proximal end portion secured to the body and a distal end portion opposite the proximal end portion;
  the first end portion of the body including a buckle and a roller assembly, the buckle configured to selectively secure the distal end portion of the strap, and the roller assembly having a generally cylindrical roller rotatable about an axis oriented transverse to a long axis of the body.

24. The accessory of paragraph 23, wherein the roller protrudes above a plane defined by the upper load-bearing surface.

25. The accessory of any of paragraphs 23-24, wherein the buckle includes a locking feature configured to prevent removal of the strap from the buckle.

26. The accessory of any of paragraphs 23-25, wherein the roller is disposed adjacent to the buckle mechanism and rotates about an axle oriented perpendicular to the long axis of the body.

27. The accessory of any of paragraphs 23-26, wherein the roller is disposed between a longitudinal center of the body and the buckle mechanism.

28. The accessory of any of paragraphs 23-27, wherein the proximal end portion of the strap is secured to the first end portion by a travelling anchor block, the anchor block configured to be movable along a path between the first end portion and the second end portion.

29. The accessory of paragraph 28, the body further including a central channel running parallel to the long axis of the body, wherein the anchor block is slidably retained by the channel.

Advantages, Features, Benefits

The different embodiments of the board carrier system described herein provide several advantages over known solutions involving vehicle rooftop carriers. For example, the illustrative embodiments of board carrier units described herein allow automatic adjustment for a range of board widths, including those of SUP boards. Additionally, and among other benefits, illustrative embodiments of the board carriers described herein may have support surfaces that include extruded pads, allowing a larger support surface for boards and automatically conforming to the shape of the board. Furthermore, side rollers of selected embodiments may facilitate loading of a board from the side of a vehicle. Additionally, illustrative embodiments of the board carriers described herein may be configured to hold one or more paddles securely in addition to a board or boards. No known system or device can perform these functions, or this combination of functions. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A rack for carrying a board on top of a vehicle having an elongate axis parallel to the direction of vehicular travel, the rack comprising:
   a pair of coupling devices for attaching a crossbar to the vehicle, the crossbar being substantially perpendicular to the elongate axis of the vehicle;
   a support unit having an elongate body, a clamp attached to a lower portion of the body for mounting the support unit to the crossbar with a long axis of the body parallel to the crossbar, a load-bearing surface including a pair of pads mounted on opposite sides of a channel defined in an upper portion of the body, and an end portion of the body including a buckle mechanism;
   a retainer movably attached to the support unit, the retainer configured to travel toward and away from the buckle mechanism in the channel and along a path substantially parallel to the long axis of the body; and
   an elongate strap having a first end portion secured to the movable retainer and a second end portion opposite the first end portion;
   wherein the buckle mechanism is configured to releasably secure the second end portion of the strap.

2. The rack of claim 1, the body further including a central channel running parallel to the long axis of the body, wherein the movable retainer is slidably retained by the channel.

3. The rack of claim 1, wherein the buckle mechanism comprises a releasable cam portion configured to prevent relative motion of the strap in one direction when engaged and to allow relative motion of the strap in two directions when released.

4. The rack of claim 1, wherein the end portion of the body is a first end portion, the body further including a second end portion, and wherein the retainer member is configured to slide freely along a predefined linear path between the first and second end portions.

5. The rack of claim 1, wherein the load-bearing surface comprises a resilient elastomer pad.

6. The rack of claim 1, further comprising a roller operatively attached to the end portion of the body.

7. The rack of claim 1, wherein the buckle mechanism is lockable to prevent release.

8. The rack of claim 1, further including a mechanical stop disposed in the path of the retainer, the mechanical stop being configured to confine movement of the retainer to a fraction of the length of the body.

9. The rack of claim 8, wherein the movement of the retainer is confined to a range equivalent to approximately ten to approximately fifty percent of the length of the body.

10. The rack of claim 8, wherein the body further includes a central channel running parallel to the long axis of the body, the movable retainer is slidably retained by the channel, and the mechanical stop is disposed in the channel.

11. A cargo specific rack accessory for carrying a board on top of a vehicle having an elongate axis parallel to the direction of vehicular travel, the accessory comprising:
    an elongate body having an upper load-bearing surface including a pair of continuous parallel support pads configured to span the entire width of a board, a first end, and a second end;
    a traveling retainer attached to the body such that the retainer is capable of traveling freely along a length of the body alternately toward and away from the first end of the body, the retainer configured to move along a channel between the pair of continuous parallel support pads while the support pads are stationary; and
    a strap having a first end portion secured by the retainer and a second end portion opposite the first end portion, the first end of the body including a buckle mechanism configured to releasably secure the second end portion of the strap;
    wherein the strap and traveling retainer are configured such that a securing width automatically adjusts to correspond to a board placed transversely on the body when the second end portion of the strap is placed over the board and pulled toward the first end of the body.

* * * * *